(12) United States Patent
Brown et al.

(10) Patent No.: US 9,795,233 B2
(45) Date of Patent: Oct. 24, 2017

(54) CONTAINER SLEEVE APPARATUS AND METHOD OF USING SAME

(71) Applicant: HABCO Industries, Inc., Tuscaloosa, AL (US)

(72) Inventors: Matthew S. Brown, Faulkner, MS (US); Lucas C. Hayes, Tuscaloosa, AL (US)

(73) Assignee: HABCO Industries, Inc., Tuscaloosa, AL (US)

( * ) Notice: Subject to any disclaimer, the term of this patent is extended or adjusted under 35 U.S.C. 154(b) by 0 days.

(21) Appl. No.: 15/201,406

(22) Filed: Jul. 2, 2016

(65) Prior Publication Data

US 2017/0000275 A1 Jan. 5, 2017

Related U.S. Application Data

(60) Provisional application No. 62/188,558, filed on Jul. 3, 2015.

(51) Int. Cl.

| | |
|---|---|
| *A47G 19/22* | (2006.01) |
| *F21V 33/00* | (2006.01) |
| *F21V 8/00* | (2006.01) |
| *F21S 9/03* | (2006.01) |
| *A47G 23/02* | (2006.01) |
| *F21V 23/04* | (2006.01) |
| *G09F 13/00* | (2006.01) |
| *G09F 23/04* | (2006.01) |
| *G09F 23/00* | (2006.01) |
| *G09F 13/22* | (2006.01) |

(52) U.S. Cl.
CPC ..... *A47G 19/2227* (2013.01); *A47G 23/0216* (2013.01); *G02B 6/0005* (2013.01); *G09F 13/00* (2013.01); *G09F 23/0091* (2013.01); *G09F 23/04* (2013.01); *A47G 2019/2238* (2013.01); *A47G 2200/08* (2013.01); *G09F 2013/222* (2013.01)

(58) Field of Classification Search
CPC ............ A47G 19/2227; A47G 23/0216; A47G 23/0241; A47G 2019/2238; A47G 2200/08; F21S 9/03; F21V 23/04; F21V 33/0004; G02B 6/0005; B65S 81/3876; G09F 13/00; G09F 23/0019; G09F 23/04; G09F 2013/222
USPC .......................................... 220/373; 206/457
See application file for complete search history.

(56) References Cited

U.S. PATENT DOCUMENTS

| | | | |
|---|---|---|---|
| 4,050,834 A | * | 9/1977 | Lee ........................... F21S 9/02 359/547 |
| 4,871,597 A | | 10/1989 | Hobson |
| 4,886,183 A | | 12/1989 | Fleming |
| 5,207,076 A | | 5/1993 | Sciarrillo |

(Continued)

*Primary Examiner* — Chun Cheung
(74) *Attorney, Agent, or Firm* — Ashley Law Firm P.C.; Stephen S. Ashley, Jr.

(57) ABSTRACT

A container sleeve apparatus includes an arcuate or cylindrical body that can be positioned on a cylindrical or conical container, such as a tumbler, cup, can or bottle. A transparent or translucent insert section that can be releasably attached to the sleeve body. The sleeve body can be made of a non-slip, elastic material, such as neoprene rubber. The insert section can be made of plastic, and can include a logo printed or engraved thereon. The apparatus can include a light emitting device that illuminates the transparent/translucent insert section.

20 Claims, 16 Drawing Sheets

(56) References Cited

U.S. PATENT DOCUMENTS

| | | |
|---|---|---|
| 5,415,305 A | 5/1995 | Drake-Tipton et al. |
| 5,969,592 A | 10/1999 | Reed |
| 6,041,952 A * | 3/2000 | Martin ............... B65D 23/085 |
| | | 215/12.1 |
| 6,092,905 A | 7/2000 | Kochn |
| 6,286,709 B1 | 9/2001 | Hudson |
| 6,786,614 B2 | 9/2004 | Ciarrocchi, Jr. |
| D516,875 S | 3/2006 | Hicks et al. |
| 7,922,031 B1 | 4/2011 | Prince |
| 8,334,780 B1 | 12/2012 | Mendoza, Jr. |
| 8,752,726 B2 | 6/2014 | Molz |
| 8,870,018 B2 | 10/2014 | Cook et al. |
| 2008/0035515 A1* | 2/2008 | Dikopf ............... A47G 19/2227 |
| | | 206/457 |
| 2008/0283538 A1* | 11/2008 | Rowen ............... B65D 81/3876 |
| | | 220/739 |
| 2008/0285621 A1* | 11/2008 | Rowen ............... B65D 81/3876 |
| | | 374/150 |
| 2010/0300913 A1* | 12/2010 | Goldburt ............... B65D 23/12 |
| | | 206/459.1 |
| 2012/0002400 A1 | 1/2012 | Lindholm |
| 2013/0168399 A1 | 7/2013 | Harrison-Griffin |
| 2014/0239003 A1* | 8/2014 | Branca, Jr. ......... A47G 23/0216 |
| | | 220/737 |
| 2015/0077975 A1 | 3/2015 | Brown |
| 2015/0182046 A1* | 7/2015 | Walsh ............... A47G 19/2227 |
| | | 206/459.5 |
| 2015/0366383 A1* | 12/2015 | Raunio ............... G09G 5/006 |
| | | 345/156 |
| 2016/0010845 A1 | 1/2016 | Brown |

* cited by examiner

CONTAINER SLEEVE APPARATUS AND METHOD OF USING SAME

CROSS REFERENCE TO RELATED APPLICATIONS

This application claims priority to Provisional Patent Application No. 62/188,558, filed Jul. 3, 2015, and which is incorporated herein by reference.

TECHNICAL FIELD OF INVENTION

The present invention relates to a sleeve for use on a container, such as a beverage can, tumbler, canister or bottle. One embodiment of the invention comprises a cylindrical sleeve having a light assembly, and a transparent or translucent section that can be illuminated by the light assembly. A logo, name or other indicia can be positioned on the transparent/translucent section.

BACKGROUND OF INVENTION

Insulating beverage sleeves, known as "coozies", "koozies" and/or "can huggies" are often used to hold beverage containers, such as beverage cans and bottles. The sleeves help to maintain the beverage at the desired temperature for a longer period of time, while also providing a comfortable means for the user to hold the beverage. The sleeve enables the user to hold the beverage without having to directly touch the beverage container itself, which may be very cold or hot. Also, there are beverage sleeves typically made of textured paper board that are adapted to fit around coffee cups (known as "coffee coozies"). These sleeves provide a comfortable means for the user to hold a hot cup of coffee, providing a barrier between the user and the hot coffee cup.

SUMMARY OF INVENTION

One object of the present invention is to provide a sleeve for use on a container, such as a beverage can, cup or tumbler. Another object of the invention is to provide a beverage sleeve for holding a beverage container, in which a portion of the sleeve is transparent or translucent. Another object of the invention is to provide a beverage sleeve, in which a portion of the sleeve can be selectively illuminated. These and other objects of the invention can be achieved in various embodiments of the invention described herein.

One embodiment of the invention comprises an apparatus for positioning on a beverage container comprising an arcuate body adapted to receive and frictionally engage a beverage container, and a light assembly attached to the arcuate body. The light assembly comprises a light emitting device, a power source operatively connected to the light emitting device to supply power to the light emitting device, and an on/off mechanism operatively connected to the light emitting device such that engaging the on/off mechanism causes the light emitting device to emit light.

According to an embodiment of the invention, the arcuate body can be positioned on a conical cup, such as a disposable plastic or paper cup. The bottom of the cup can be positioned through arcuate body, and the arcuate body can be slid up the conical cup until reaching a circumference of the cup sufficient for the arcuate body to frictionally engage the cup.

According to another embodiment of the invention, the arcuate body can be made of plastic.

According to another embodiment of the invention, the light emitting device comprises a flexible printed circuit board, a light emitting diode, and/or an illuminated fiber optic cable.

According to another embodiment of the invention, wireless technology, such as the wireless communication technology sold under the mark "BLUETOOTH", can be operatively connected to the light assembly and a remote control, such that the remote control can turn the light emitting device on and off. The remote control can be a computing device comprising a computer processor, such as a computer or mobile smartphone.

According to another embodiment of the invention, the power source is comprised of a battery and/or solar cell.

According to another embodiment of the invention, the on/off mechanism comprises a button and/or switch.

According to another embodiment of the invention, the arcuate body has a concave inner surface and a convex outer surface.

According to another embodiment of the invention, the light emitting device comprises a flexible printed circuit board attached to the outer surface of the arcuate body.

According to another embodiment of the invention, the arcuate body includes an opening formed in a central region of the arcuate body, and the light emitting device comprises a flexible printed circuit board positioned within the opening.

According to another embodiment of the invention, a logo can be printed on the flexible printed circuit board.

According to another embodiment of the invention, the power source comprises at least one battery attached to the outer surface of the arcuate body, and the on/off mechanism comprises a button attached to the outer surface of the arcuate body.

According to another embodiment of the invention, the arcuate body is attached to a resilient cylindrical outer cover member having an inner surface and an outer surface and an opening formed therein. The outer cover member has a transparent or translucent insert section positioned over the opening. The outer surface of the arcuate body is attached to the inner surface of the outer cover member, and the flexible printed circuit board is aligned with the opening formed in the outer cover member, such that light emitted from the flexible printed circuit board can pass through the transparent or translucent insert section.

According to another embodiment of the invention, a logo can be printed or engraved on the insert section. The logo can comprise any alphanumeric characters and/or graphics, such as a company name, trademark, sports team and/or school name or insignia.

Another embodiment of the invention comprises a beverage container having a base and a sidewall extending upwardly from the base, and a light assembly positioned on the container. The light assembly comprises a light emitting device attached to an outer surface of the sidewall of the container, a power source operatively connected to the light emitting device to supply power to the light emitting device, and an on/off mechanism operatively connected to the light emitting device, wherein engaging the on/off mechanism causes the light emitting device to emit light. An elastic sleeve is positioned on the outer surface of the sidewall of the container having a central opening formed therein, and an insert section is releasably attached to the elastic sleeve and covers the central opening of the elastic sleeve. The insert section is comprised of a transparent or translucent material and is aligned with the light emitting device such that the light emitting device emits light through the insert section.

According to another embodiment of the invention, the container can be a cylindrical or conical tumbler, the elastic sleeve is cylindrical, and the insert section is arcuate.

According to another embodiment of the invention, an indented section is formed on the outer surface of the sidewall of the container, and the elastic sleeve is positioned within the indented section whereby the elastic sleeve sits flush with the outer surface of the sidewall.

According to another embodiment of the invention, the light emitting device comprises a flexible printed circuit board attached to the outer surface of the sidewall of the container. The power source comprises at least one battery mounted on the outer surface of the sidewall, and the on/off mechanism comprises a button mounted on the outer surface of the sidewall.

According to another embodiment of the invention, the insert section comprises a center section and first and second opposed flanges extending outwardly from the center section. First and second recessed sections are formed in the inner surface of the elastic sleeve proximate the central opening of the elastic sleeve and adapted to receive the first and second flanges of the insert section whereby the insert section is maintained within the sleeve.

According to another embodiment of the invention, a logo is printed or engraved on the insert section, and the light emitting device illuminates the logo.

According to another embodiment of the invention, the insert section comprises a photo luminescent material.

According to another embodiment of the invention, the elastic sleeve has first and second ends, and at least one knob extending upwardly form the outer surface of the sleeve proximate the first end, and at least one opening formed proximate the second end sized and shaped to receiving the knob so that the first and second ends can be releasably attached to each other.

Another embodiment of the invention comprises a beverage container comprising a base and a sidewall extending upwardly from the base, wherein the sidewall has an arcuate section and a flat face section. A light emitting device such as a flexible printed circuit board can be attached to the flat face section of the sidewall. An elastic sleeve can be positioned on the outer surface of the sidewall, and the elastic sleeve can include a flat transparent/translucent insert section that is positioned over the flexible printed circuit board. A logo can be printed or engraved on the insert section.

Another embodiment of the invention comprises a beverage container comprising a base, a transparent or translucent outer sidewall extending upwardly from the base, and an inner sidewall positioned interiorly to the outer sidewall. A light assembly comprising a plurality of light emitting devices, such as light emitting diodes, are positioned within the space between the inner and outer sidewalls. The light assembly includes a power source and an on/off mechanism operatively connected to the plurality of light emitting devices. The beverage container can include a handle, and the power source and on/off mechanism can be attached on the handle.

Another embodiment of the invention comprises an insulating sleeve for holding a beverage container, such as a can, cup, tumbler, canister or bottle. The sleeve includes a transparent or translucent section formed therein, which allows for a portion of the exterior of the beverage container, such as the container logo, to be visible through the transparent/translucent section of the sleeve.

According to another embodiment of the invention, a logo can be printed or engraved on the top surface of the transparent/translucent section of the sleeve.

According to another embodiment of the invention, the sleeve includes a light assembly that is adapted to illuminate the transparent/translucent section. The transparent/translucent section can be positioned so as to allow a logo or other indicia on the beverage container to be visible through the transparent/translucent section of the sleeve, and the light assembly illuminates beverage container logo.

According to another embodiment of the invention, the sleeve is made of a non-slip, elastic, insulating material, such as neoprene or foam rubber.

Another embodiment of the invention comprises a cup and a sleeve adapted for use on the cup. The cup has an indented section, and the insulating sleeve is sized and shaped for positioning within the indented section, thereby providing a flush outer surface of the cup.

DETAILED DESCRIPTION OF PREFERRED EMBODIMENTS OF INVENTION

Figure 1:
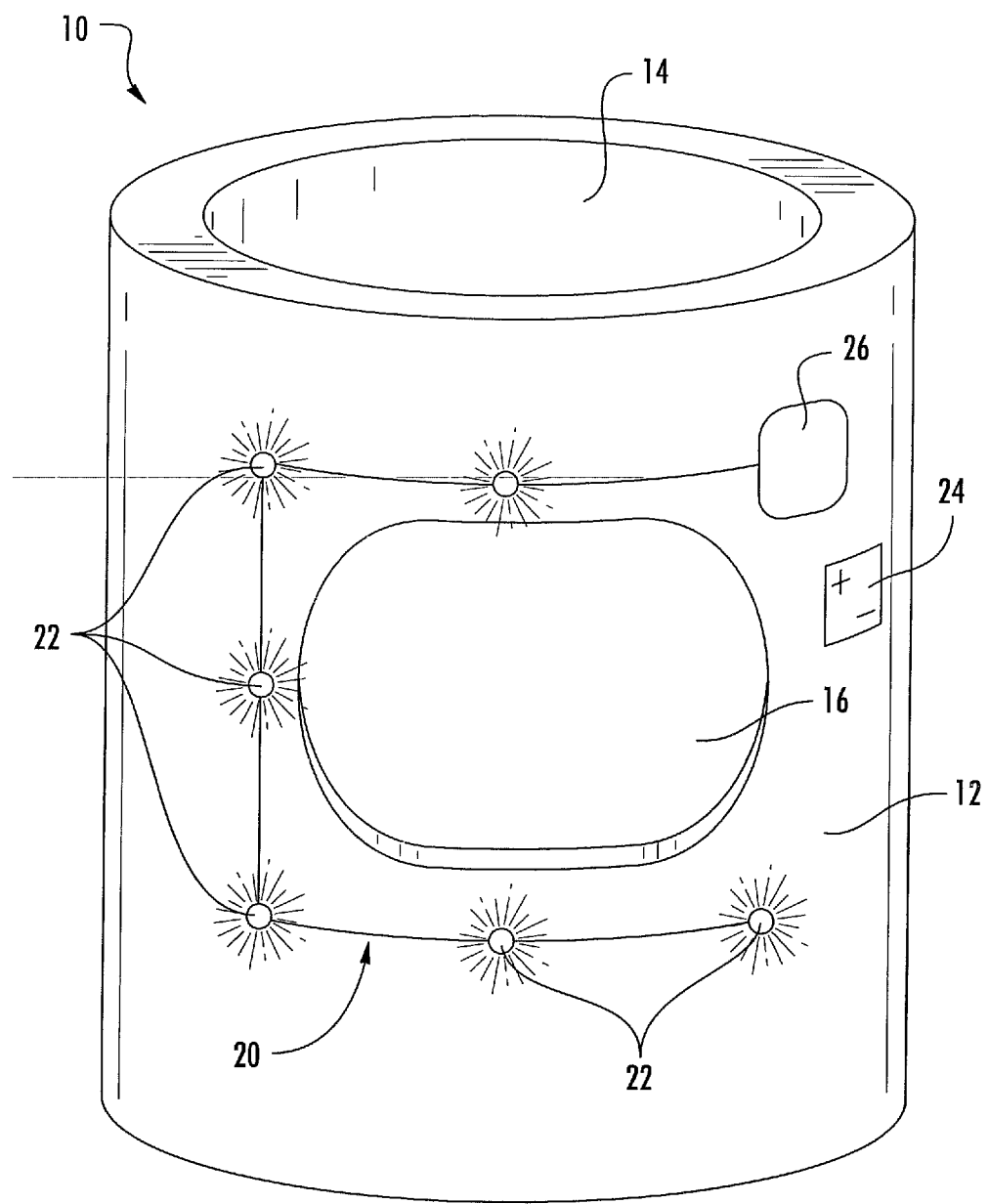
FIG. 1 is a perspective view of a container sleeve according to an embodiment of the invention.

A container sleeve according to a preferred embodiment of the invention is illustrated in FIG. 1, and shown generally at reference numeral 10. The container sleeve 10 comprises a substantially cylindrical body 12. The body 12 is comprised of a thermal insulating material, such as neoprene, foam rubber, plastic or other suitable material. The body 12 has a circular opening 14 at the top, which is sized to receive a conventional beverage can or bottle therethrough. A portion of the insulating material is cut out and replaced with an insert section 16 made of a transparent or translucent material, such as polycarbonate plastic. The insert section 16 can also comprise a photoluminescent material so that the insert section 16 glows in the dark.

The sleeve 10 includes a light assembly 20 housed in the body 12. The light assembly 20 is comprised of a plurality of light emitting devices 22, a power source 24 operatively connected to supply power to the light emitting devices 22, and an on/off button 26 operatively connected to the light emitting devices 22 for selectively turning the light emitting devices on and off. Preferably, each light emitting device 22 comprises a light emitting diode (LED). Alternatively, each light emitting device 22 can comprise an illuminated fiber optic cable, or other suitable light emitting device. The light emitting diodes 22 are positioned at an angle, such that they emit light toward the insert section 14, and illuminate the insert section 16. The sleeve 10 can include a second light assembly and second insert section on the opposite side of the sleeve not shown in the drawings.

Preferably, the power source 24 comprises a battery. Alternatively, the power source 24 can be a solar cell that powers the light emitting diodes 22. In another alternative embodiment, the power source 24 can be a solar cell that recharges a battery that powers the light emitting diodes.

In yet another alternative embodiment, the light assembly 20 includes a thermal sensor operatively connected to the power source 24 so that the light emitting diodes 22 are activated when the sensor detects a predetermined high or low temperature in the beverage container. In yet another alternative embodiment, the power source 24 can be recharged from temperature variations of the beverage container 50, utilizing a stirling engine.

Figure 2:
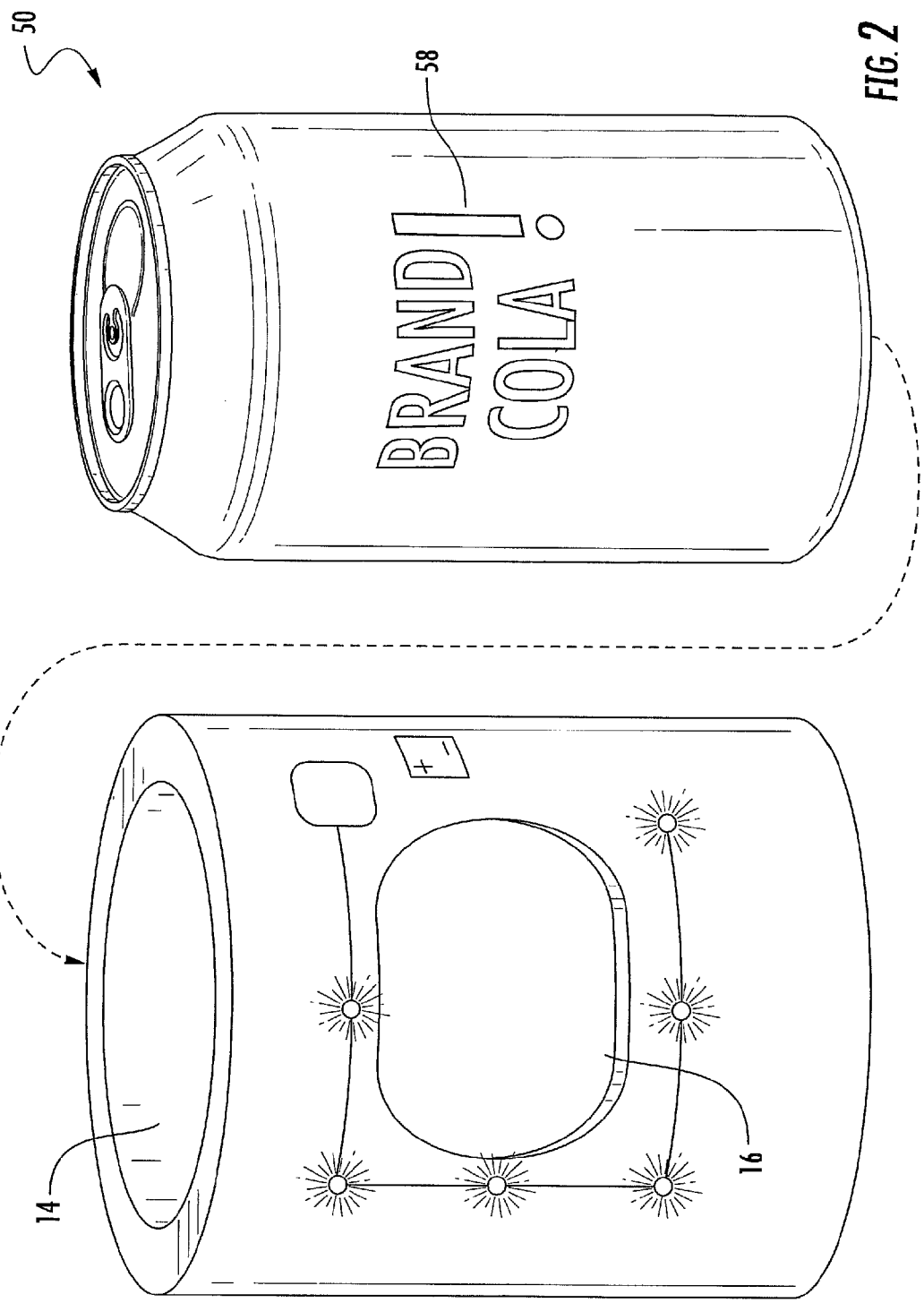
FIG. 2 is a perspective environmental view of the sleeve of FIG. 1 with a beverage can.
Figure 3:
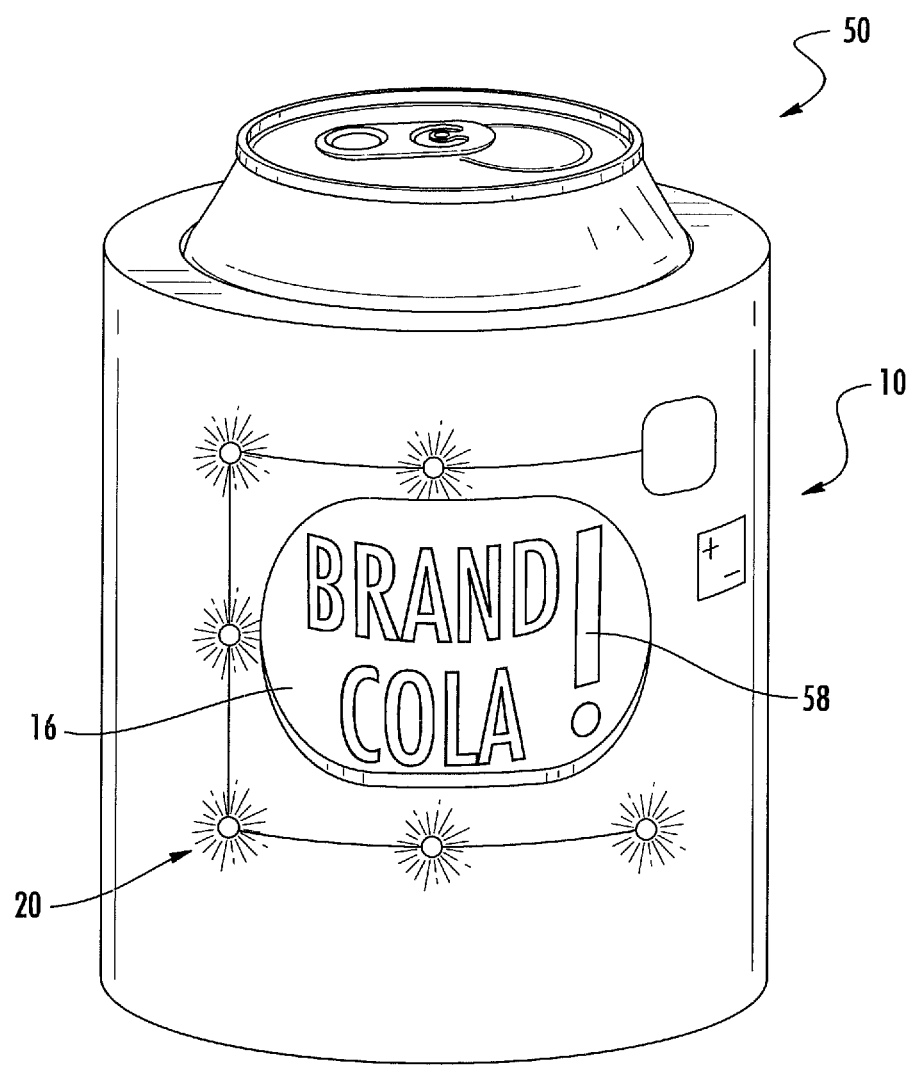
FIG. 3 is another perspective environmental view of the sleeve of FIG. 1 with a beverage can.

FIGS. 2 and 3 illustrate a method of using the sleeve 10 according to a preferred embodiment of the invention. A container, such as a beverage can 50 is received through the top opening 14 of the body 12 of the sleeve 10, as shown in FIGS. 2 and 3. The can 50 can be positioned within the sleeve so that the insert section 16 is aligned with a logo 58 on the exterior of the can 50. As such, the can logo 58 can be seen through the sleeve 10.

Alternatively, a logo can be engraved or printed on the top surface of the insert section 16. The logo can comprise any alphanumeric characters and/or graphics, such as a company name, trademark, sports team and/or school name or insignia. The insert section 16 can be removed from the sleeve 10, and replaced with another insert section having a different logo. The light assembly 20 can be turned on by pressing the on/off button 26, and the light emitting diodes 22 illuminate the can logo 56 by emitting light through the insert section 16.

FIGS. 4-8 illustrate another preferred embodiment of the invention comprising a container apparatus 101 comprised of a container sleeve 100 and a tumbler cup 150. The container sleeve 100 is adapted for use with the tumbler cup 150. The sleeve 100 comprises a substantially cylindrical body 112 having an opening 114 that is sized to receive a typical tumbler cup, such as a 20 oz. tumbler. The sleeve body 112 can be made of a comfortable non-slip, resilient, elastic material, such as neoprene or foam rubber.

The sleeve 100 includes an arcuate insert section 116 made of a transparent or translucent material, such as polycarbonate plastic. The insert section 116 can also comprise a photoluminescent material so that the insert section 116 glows in the dark.

Figure 4:
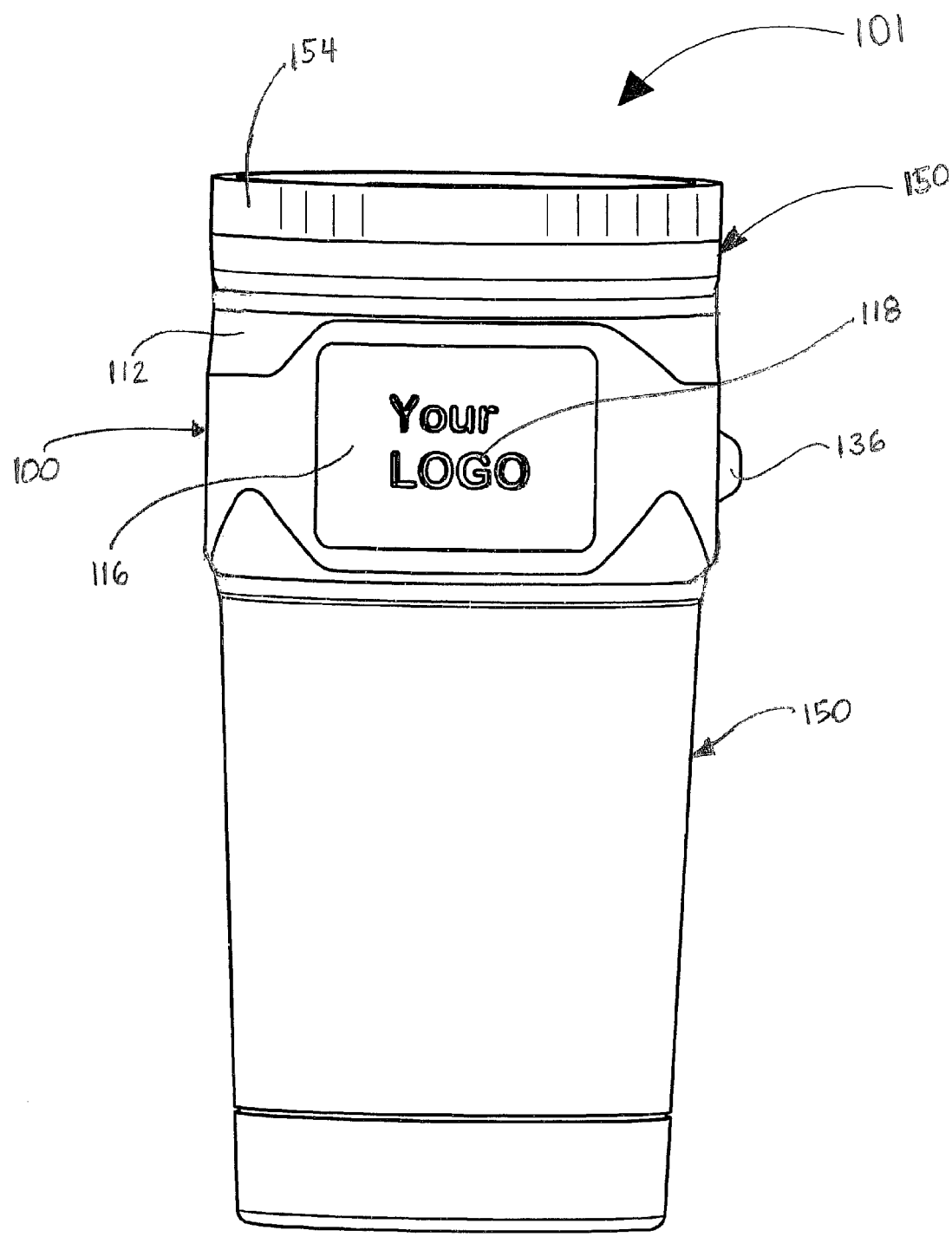
FIG. 4 is front elevation of a container apparatus according to another embodiment of the invention.
Figure 5:
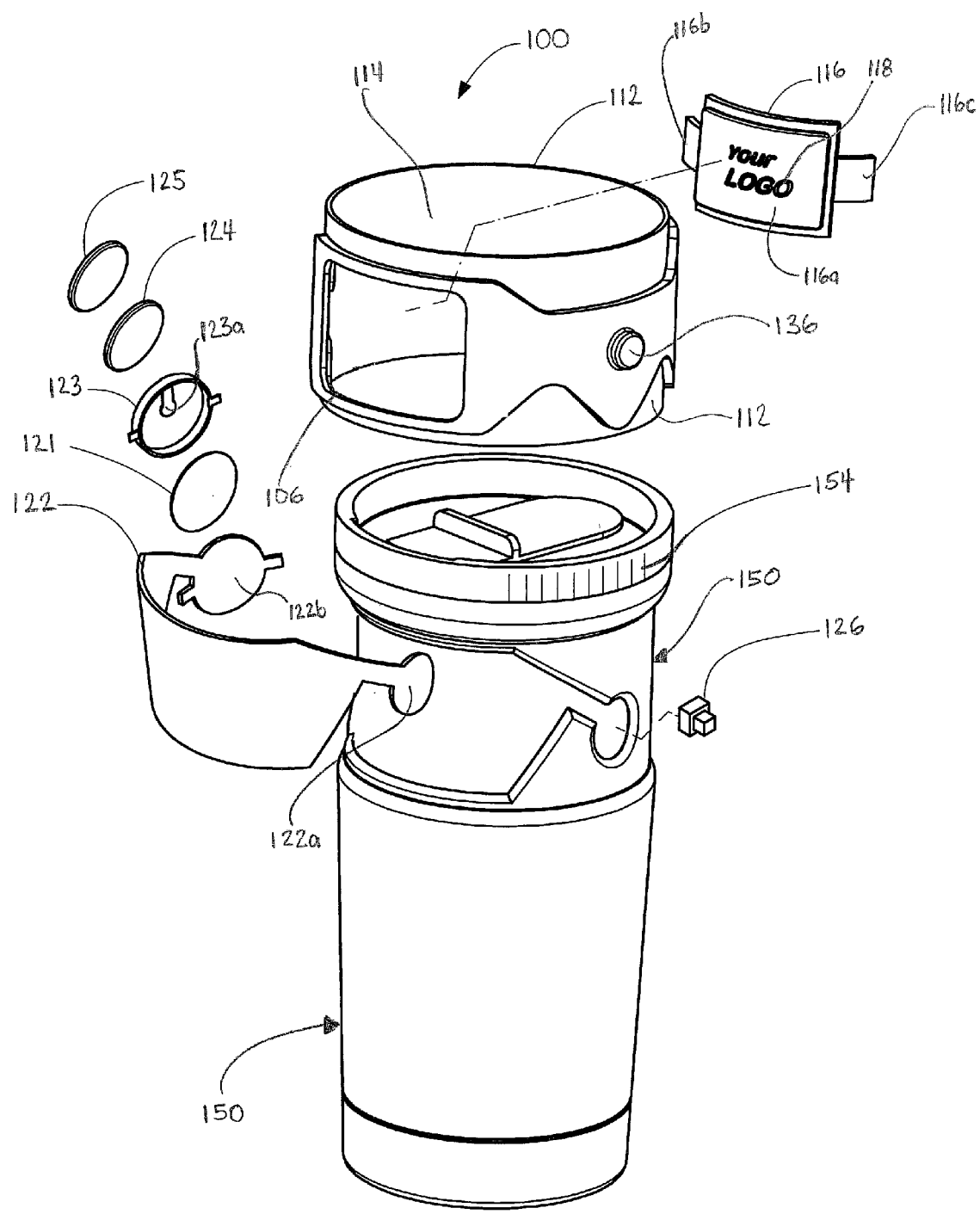
FIG. 5 is an exploded perspective view of the container apparatus of FIG. 4.
Figure 7:
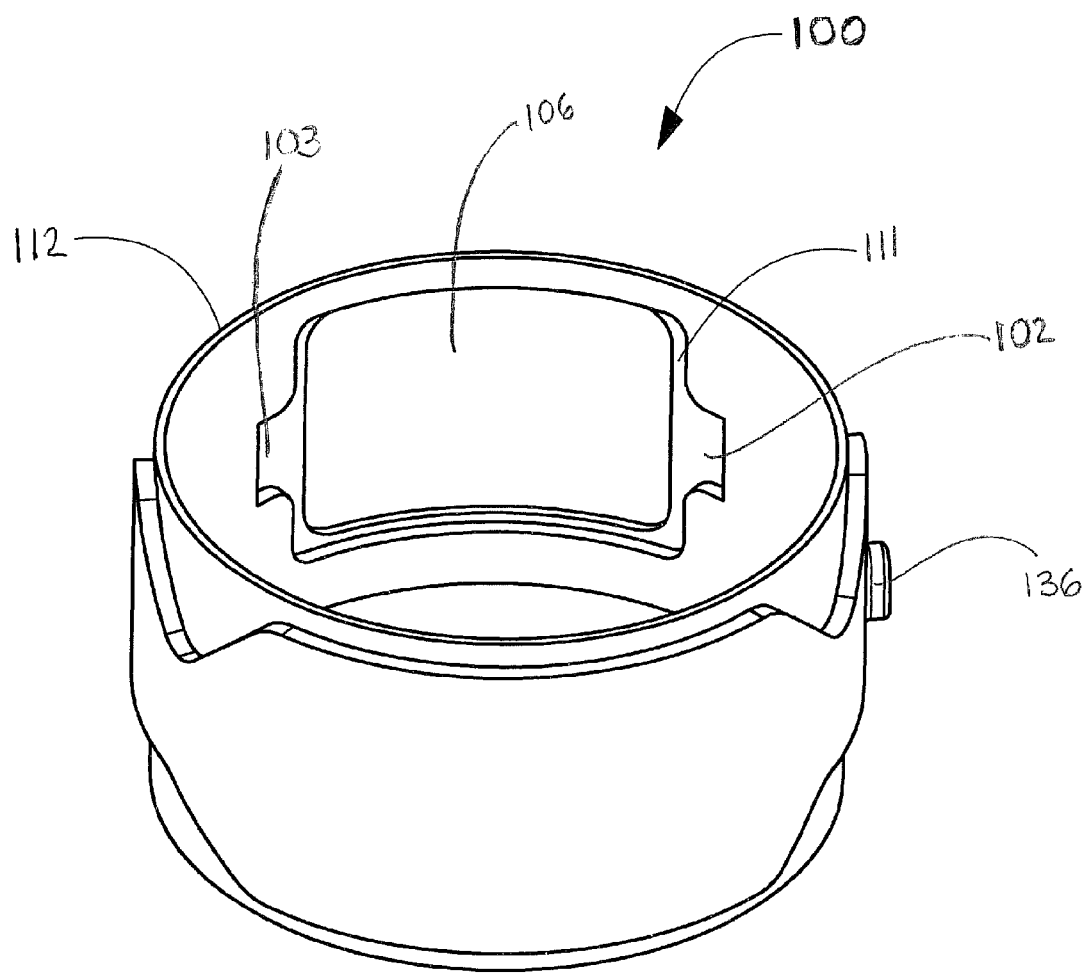
FIG. 7 is a perspective view of the sleeve of the container apparatus of FIG. 4.
Figure 8:
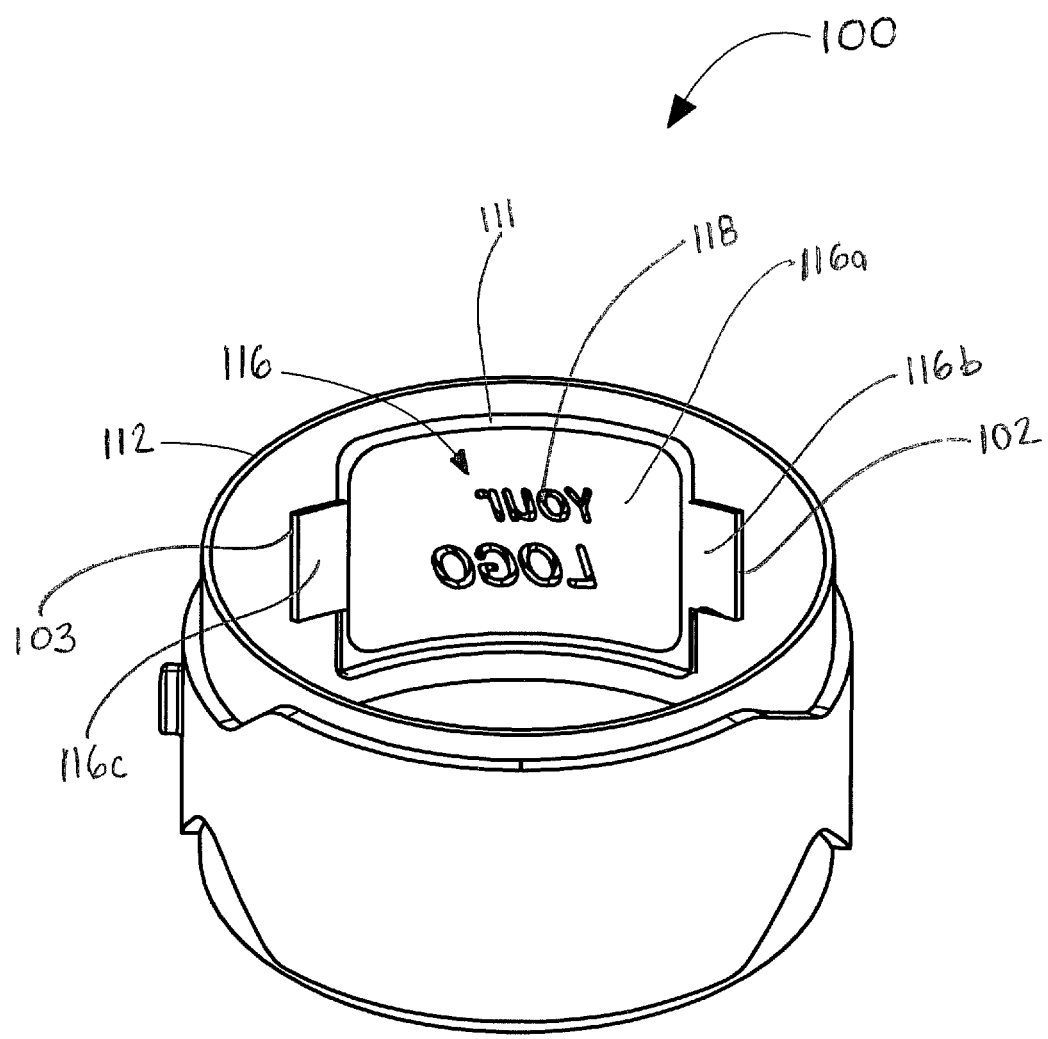
FIG. 8 is another perspective view of the sleeve of the container apparatus of FIG. 4.

The insert section 116 comprises an arcuate shaped piece having a rectangular portion 116a and a pair of flanges 116b, 116c on opposite sides of the rectangular portion 116a, as shown in FIG. 5. The sleeve 100 includes a rectangular opening 106 that has an area approximately equal to the area of rectangular portion 116a of the insert section 116. A recessed area 111 is formed in the interior surface of the sleeve 100 at the edge of rectangular opening 106. The recessed area 111 includes a pair of complementary recesses 102, 103 formed in the interior surface of the sleeve 100 at opposite sides of rectangular opening 106, as shown in FIG. 7. The flanges 116b, 116c of the insert section 116 are received in the sleeve recesses 102, 103, respectively, as shown in FIG. 8. Positioning of the insert section flanges 116b, 116c in the sleeve recesses 102, 103 helps maintain the insert section 116 in place in the sleeve 100. The sleeve 100 can be positioned on the tumbler 150, as shown in FIG. 4.

A logo 118 can be engraved or printed on the top surface of the insert section 116 of the sleeve 100. The term "logo", as used throughout this application, refers generally to any distinctive markings, alphanumeric characters and/or graphics. The logo 118 can be, but is not limited to, a company name, trademark, sports team name and/or school name or insignia. The insert section 116 can be removed from the sleeve 100 when desired, and replaced with another insert section having a different logo. As such, a variety of logos can be used with the sleeve 100. When desired, a user can pull the sleeve 100 off of the tumbler 150, and remove the insert section 116 from the sleeve and replace it with another insert section having a different logo.

The tumbler 150 can include a light assembly 120. The light assembly 120 can be comprised of a light emitting device 122, a power source operatively connected to the light emitting device 122 to supply power to the light emitting device 122, and an on/off mechanism 126 operatively connected to the light emitting device 122 for selectively turning the light emitting device 122 on and off. Preferably, the light emitting device 122 is a flexible printed circuit board (FPCB). Alternatively, the light emitting device 122 can comprise a light emitting diode (LED), an illuminated fiber optic cable, or other suitable light emitting device. The flexible printed circuit board 122 is positioned on the outer surface of the tumbler 150.

Preferably, the power source comprises two batteries 124, 125. Each of the batteries 124, 125 can be a lithium CR2016 3V battery. Alternatively, the power source can be a solar cell that powers the FPCB 122. In another alternative embodiment, the power source can include a solar cell that recharges one or more batteries that power the FPCB 122. In yet another alternative embodiment, the power source can be recharged from temperature variations of the tumbler 150, utilizing a stirling engine.

Preferably, the on/off mechanism comprises a button 126. Alternatively, the on/off mechanism can be a tilt switch that turns on the FPCB 122 by a mechanism making power contact when the switch is tilted or shaken. The on/off button 126 is operatively connected to the flexible printed circuit board 122 at an ear portion 122a of the flexible printed circuit board 122, as shown in FIG. 5. A negative sharpnel 121 and a battery case/positive sharpnel 123 are positioned on the opposite ear portion 122b of the flexible printed circuit board 122, as shown in FIG. 5. The batteries 124, 125 are positioned in the battery case/positive shrapnel 123. The batteries 124, 125 are positioned with their negative surfaces facing the body of the tumbler 150, and their positive surfaces facing away from the tumbler 150. As such, the negative surface of the inner most battery 124 contacts the negative shrapnel 121, and the positive surface of the outer most battery 125 contacts the tongue 123a of the battery case/positive shrapnel 123.

The flexible printed circuit board 122, battery case 123 and on/off button 126 can be attached to the outer surface of the tumbler 150 by a transparent adhesive film that is positioned over the flexible printed circuit board 122 and around the battery case 123 and on/off button 126, and adhered to the outer surface of the tumbler 150. Alternatively, the flexible printed circuit board 122 can be directly adhered to the tumbler 150 with an adhesive.

Figure 6:
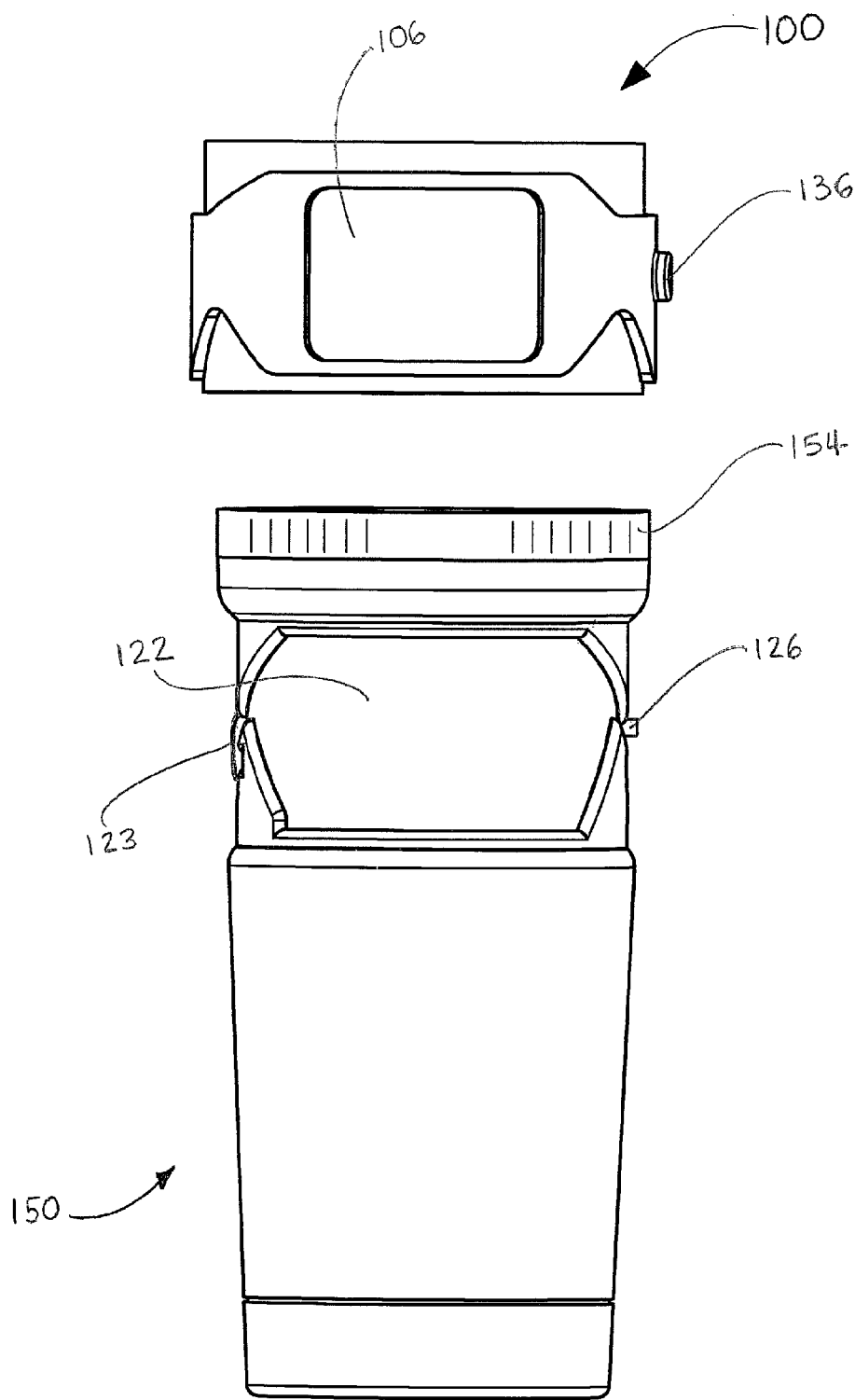
FIG. 6 is another front elevation of the container apparatus of FIG. 4, showing the sleeve separate from the tumbler.

The sleeve 100 is positioned on the outer surface of the tumbler such that the insert section 116 is substantially aligned with the flexible printed circuit board 122, as shown in FIGS. 4-6. Two recesses can be formed in the interior surface of the sleeve 100 to accommodate the on/off button switch 126 and the battery case 123. The sleeve 100 includes a raised circular portion 136 that covers the on/off button switch 126 when the sleeve 100 is positioned on the tumbler 150, as shown in FIG. 4. When so positioned, the user can press on the raised circular portion 136 to press the on/off button switch 126 housed therein, thereby turning the flexible printed circuit board 122 on and off. Pressing the raised circular portion 136 of the sleeve 100 turns the flexible printed circuit board 122 on, causing the flexible printed circuit board 122 to emit light through the insert section 116 and illuminate the logo 118 of the insert section 116. When the user wishes to changes the insert section 116, or if the batteries 124, 125 need to be changed, the sleeve 100 can be slid off of the tumbler 150 and the insert section 116 and/or batteries 124, 125 can be easily accessed.

The light assembly 120 can include a thermal sensor operatively connected to the batteries 124, 125 so that the flexible printed circuit board 122 is activated when the sensor detects a predetermined high or low temperature in the beverage container.

As shown in FIG. 6, a portion of the outer surface of the tumbler 150 is indented to form an indented section 152. The opening 114 of the sleeve 100 is sized and shaped such that the top or bottom of the tumbler 150 can be positioned therethrough, and the body 112 of the sleeve 100 is sized and shaped so that it can be positioned within the indented section 152 and sit substantially flush with the remaining non-indented portion of the tumbler 150, as shown in FIG. 4.

The tumbler 150 can include a plastic screw-on top lid 154. The tumbler 150 is preferably made of 18/8 (18% chromium/8% nickel) stainless steel, or other suitable material.

In an alternative embodiment, the light assembly 120 can be attached to the sleeve 100, instead of the tumbler 150. As such, the sleeve 100 can be used on any conventional container. The light assembly 120 can be attached to the inner surface of the sleeve 100. The flexible printed circuit board 122 is positioned directly against the insert section 116, and the on/off button switch 126 and the battery case 123 are received in recesses formed in the interior surface of the sleeve 100. The flexible printed circuit board 122 can be attached to the inner surface of the sleeve 100 by an adhesive or other suitable attachment means.

Figure 9:
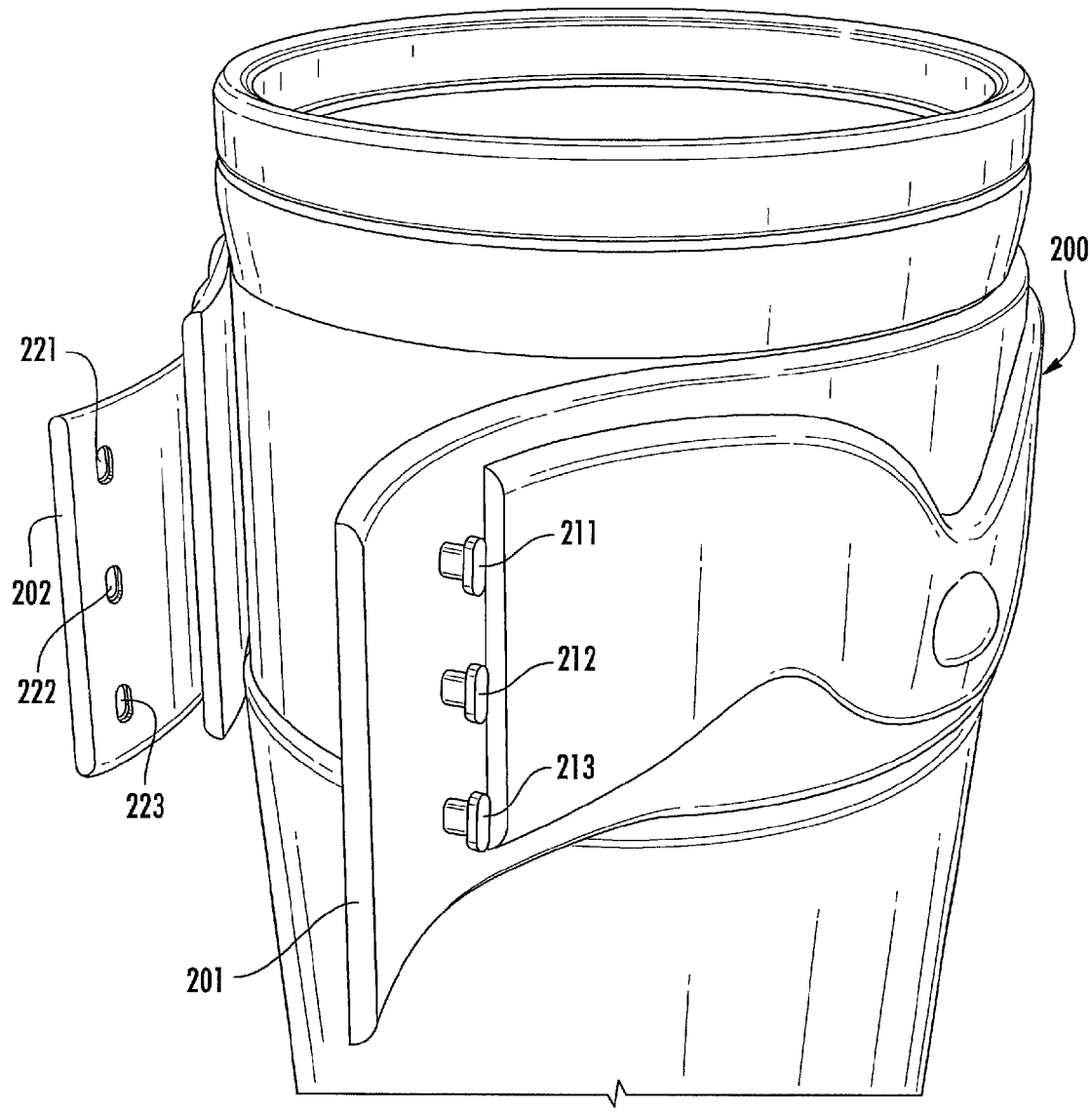
FIG. 9 is an environmental perspective view of a container sleeve according to another embodiment of the invention.
Figure 10:
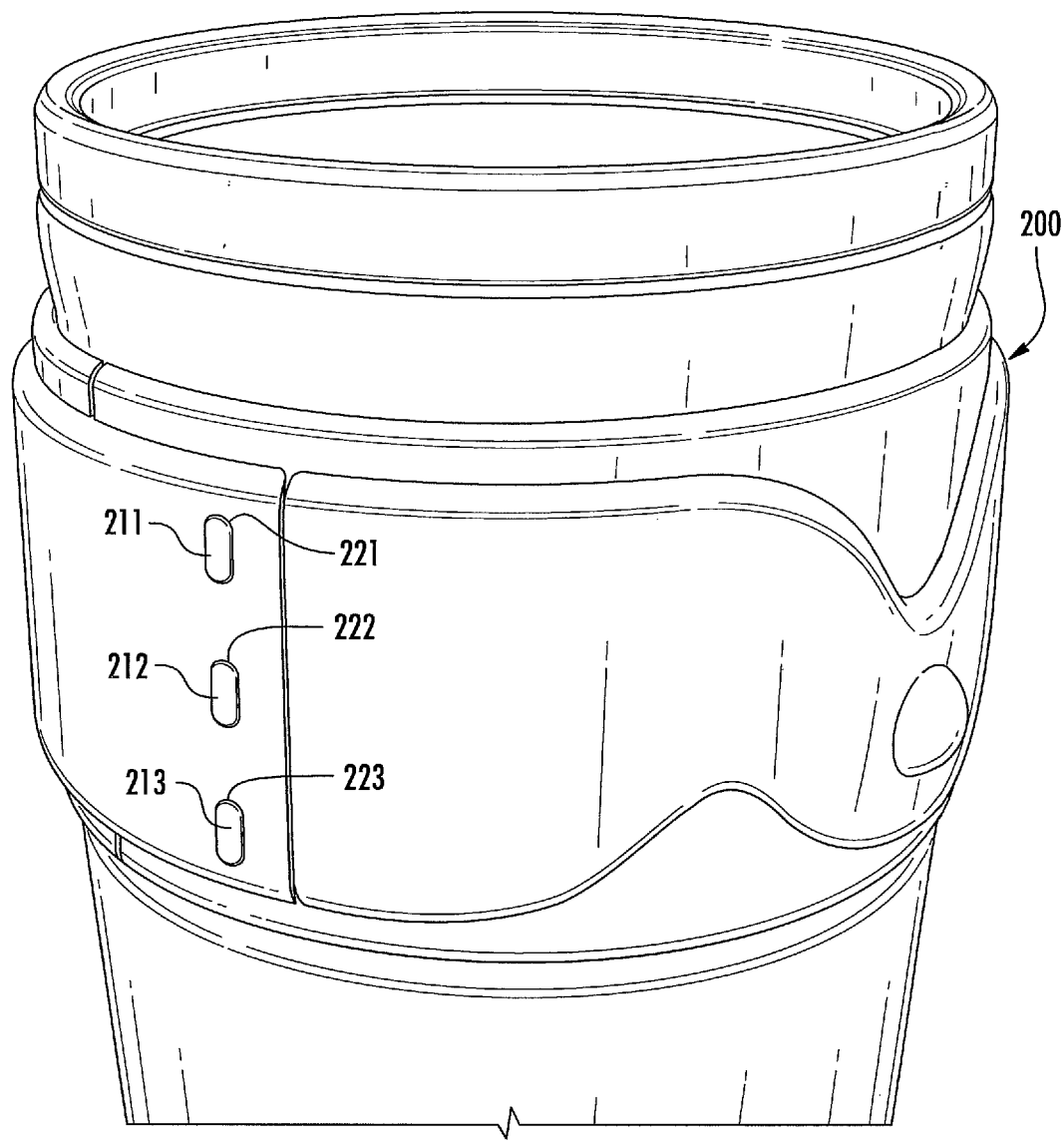
FIG. 10 is another environmental perspective view of the container sleeve of FIG. 9.
Figure 11:
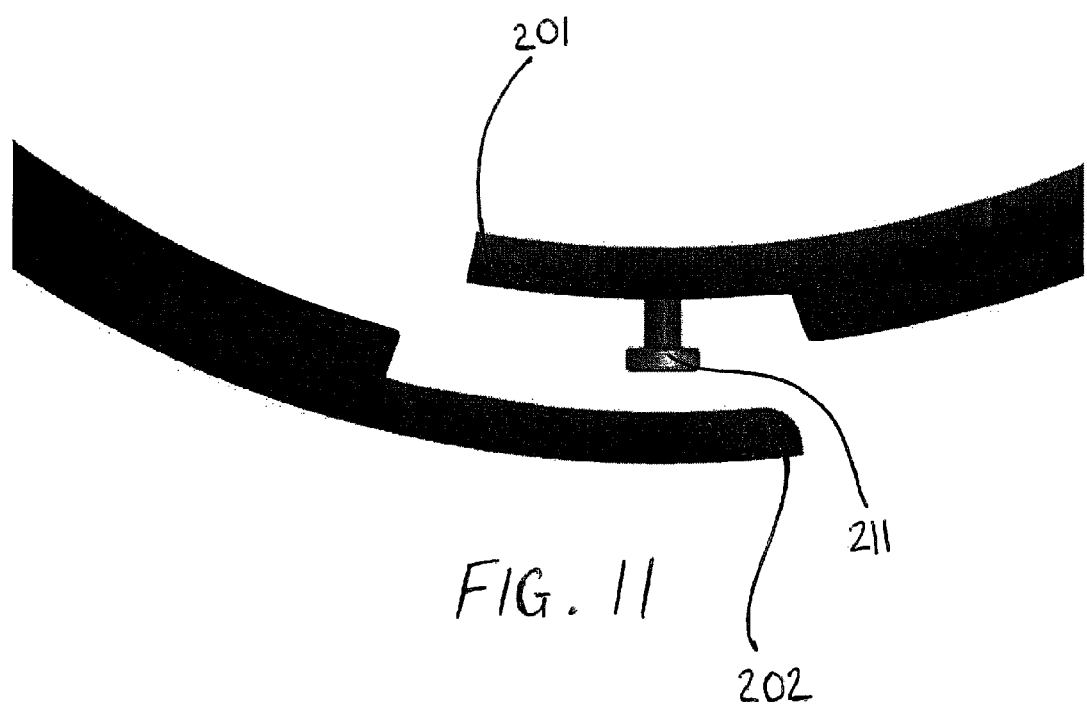
FIG. 11 is a partial top plan view of the container sleeve of FIG. 9.

A container sleeve according to an alternative embodiment is illustrated in FIGS. 9-11, and shown generally at reference numeral 200. The container sleeve 200 is similar in structure to the previously described container sleeve 100, except that it is not a continuous circular piece, but instead is a substantially flexible, rectangular piece having first and second ends and attachment means that enable the first and second ends to be releasably attached after being wrapped around the outer surface of a tumbler or other container.

As shown in FIGS. 9 and 10, the sleeve 200 includes opposed first and second ends 201, 202. A plurality of knobs 211, 212, 213 extend upwardly from the outer surface of the sleeve 200 in a linear alignment proximate one end 201. The knobs can be made of plastic and integrally formed on the sleeve 200, such as by injection molding. An equal number of linearly aligned openings 221, 222, 223 are formed in the sleeve 200 proximate the opposite end 202. Each of the openings 221, 222, 223 is sized and positioned to receive and engage one of the knobs 211, 212, 213, respectively, as shown in FIG. 10. When so engaged, the sleeve is securely maintained on the tumbler. Alternatively, the sleeve 200 can include additional pluralities of linearly aligned openings positioned further away from the second end 202 of the sleeve 200 to allow for the sleeve to adjust to tumblers/containers of varying circumference.

Figure 12:
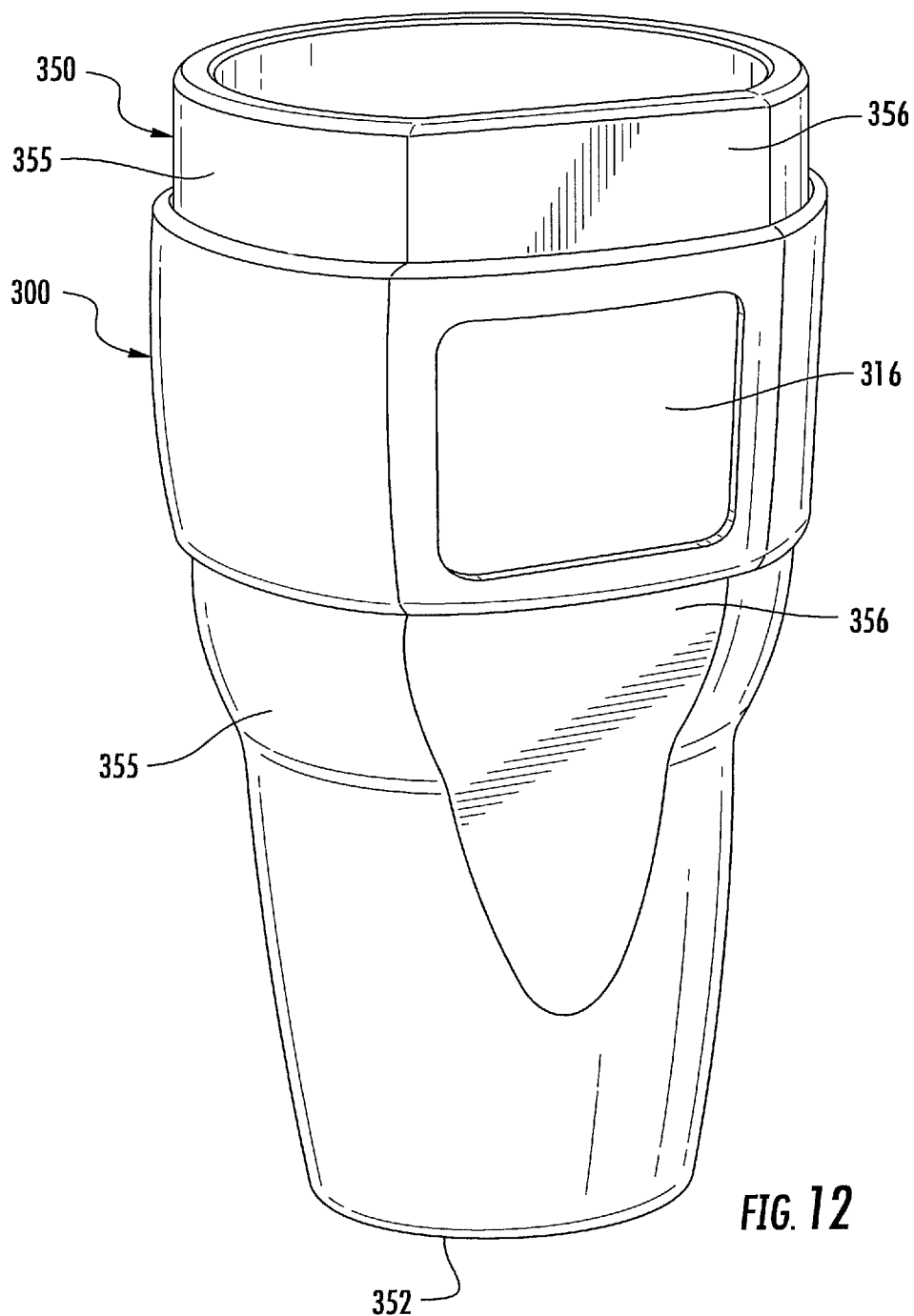
FIG. 12 is a perspective view of a container apparatus according to another embodiment of the invention.
Figure 13:
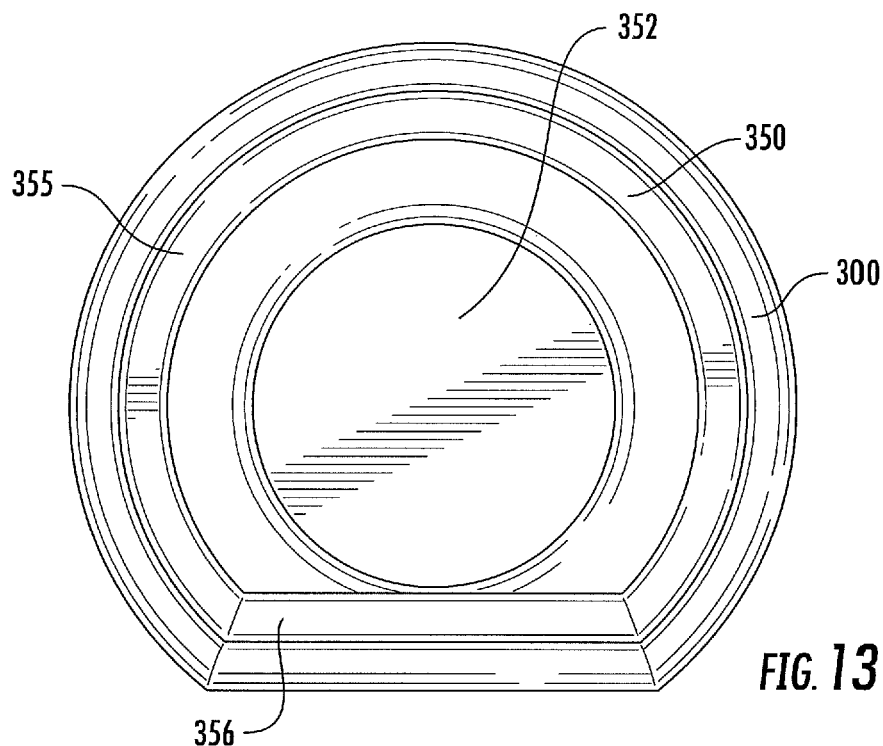
FIG. 13 is a top plan view of the container apparatus of FIG. 12.

FIG. 12 illustrates a beverage container and container sleeve according another preferred embodiment of the invention. The container, shown generally at reference numeral 350, comprises a tumbler cup having the same structure and features as the previously described tumbler 150, except that the sidewall of the container 350 is comprised of an arcuate section 355 extending upwardly from the base 352, and a flat front face section 356, on which the flexible printed circuit board is positioned. The container sleeve 300 includes a flat shaped insert section 316 that is positioned over flexible printed circuit board on the container 350. The flat face 356 allows for a flat orientation of the flexible printed circuit board and the insert section 316, which can result in better illumination of the insert section 316.

Figure 14:
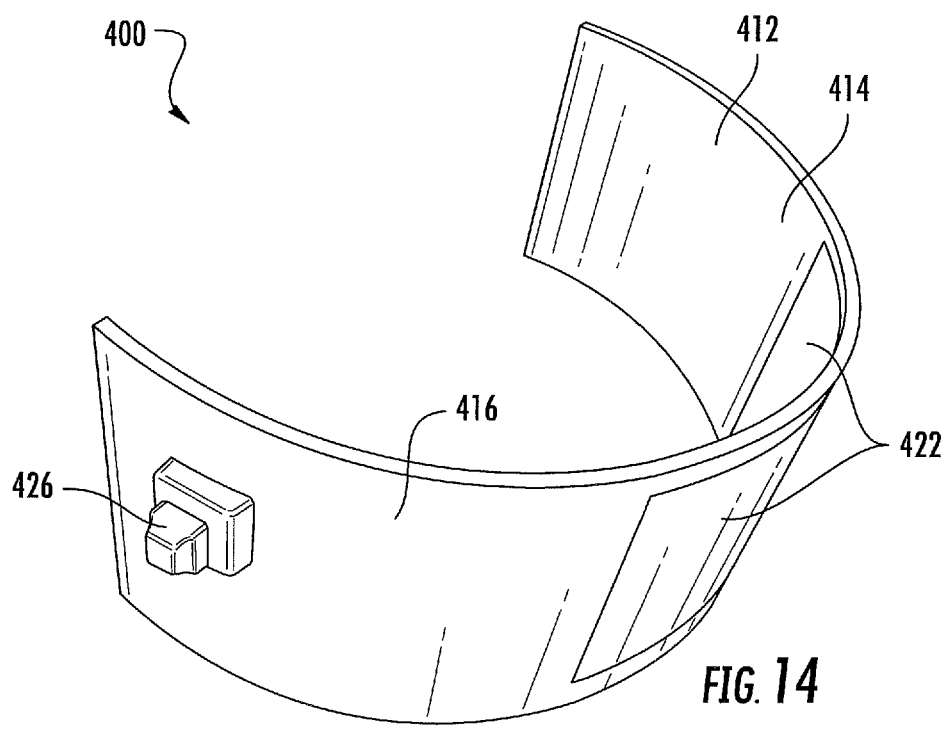
FIG. 14 is a container sleeve according to another embodiment of the invention.

A container sleeve according to another preferred embodiment of the invention is illustrated in FIG. 14, and shown generally at reference numeral 400. The container sleeve 400 comprises an arcuate body 412 having a substantially rectangular opening formed in the center of the body 412. The sleeve body 412 has an inner concave surface 414, and an outer convex surface 416, as shown in FIG. 14. The sleeve body 412 is preferably made of plastic or other suitable material.

A light source, such as a flexible printed circuit board 422, is positioned within the rectangular opening of the body 412. In an alternative embodiment, the sleeve body 412 does not have a central opening, and instead the flexible printed circuit board 422 is adhered to the outer surface 416 of the sleeve body 412.

An on/off button 426 is positioned on the outer surface 416 of the body 412 proximate one end of the body 412. A power source is positioned on the outer surface 416 of the sleeve body 412 and is operatively connected to the FPCB 422 to power the FPCB 422. The power source can comprise one or more batteries positioned within a battery case attached to the sleeve body 412. Alternatively, the power source can comprise a solar cell that powers the FPCB 122. In another alternative embodiment, the power source can comprise a solar cell that recharges a battery that powers the FPCB 422. The flexible printed circuit board 422 is turned on by pressing the on/off button 426. A logo can be printed on the flexible printed circuit board 422. Alternatively, the logo can be printed on a transparent or translucent lense that is positioned over the flexible printed circuit board 422. The logo can comprise any distinctive markings, alphanumeric characters and/or graphics, such as a company name, trademark, sports team name and/or school name or insignia.

In a method of using the sleeve 400 according to a preferred embodiment of the invention, the sleeve 400 can be positioned on a conical cup, such as a disposable plastic or paper cup. The bottom of the cup can be positioned through the sleeve 400, and the sleeve 400 can be slid up the conical cup until the sleeve reaches a circumference of the cup sufficient for the sleeve 400 to frictionally engage the cup. A plurality of the sleeve 400 can be used with a large number of disposable cups, such as at sports or entertainment events. A logo of a particular sports team participating at a particular sporting event can be printed on the FPCB 422 of the plurality of sleeves 400. The sleeves 400 can be distributed to fans at the sporting event, and the fans can position the sleeves 400 on the disposable cups distributed at the sporting event. Fans can hold up their cups and activate the sleeves 400 by pressing the on/off button 426 to illuminate the logo during the game as a gesture of support for the sports team. Likewise, a logo of a particular performer, such as a musical group, can be printed on the FPCB 322 of the plurality of sleeves 400, and the sleeves distributed to attendees of the performer's performance. The attendees can position the sleeves 400 on beverage cups provided at the performance, and can activate the sleeves 400 to illuminate the logo during the performance.

In an alternative embodiment, the sleeve 400 can include wireless technology, such as the wireless communication technology sold under the mark "BLUETOOTH", which is operatively connected to the flexible printed circuit board 422 and a remote control, such that the remote control can turn the flexible printed circuit board 422 on and off. The remote control can be a computing device comprising a computer processor, such as a computer or mobile smartphone. A plurality of the sleeves 400 can be distributed to the attendees of a sporting event, and can be operatively linked to a single remote control that activates all of the sleeves 400 at once when a particular play occurs during the game. The remote control can be operated by a human user that activates the FPCB 422 of the sleeves 400 at times the user deems appropriate. Alternatively, the remote control comprises a computer processor and a non-transitory computer readable storage medium comprising software having programming instructions that, when executed, cause the computer processor to automatically activate the FPCB 422 of the sleeves 400 whenever a particular event(s) occurs during the game, such as when a football team scores a touchdown or a baseball team hits a home run. In an alternative embodiment, the software can be integrated into a mobile application that can be downloaded onto mobile smartphones and allows each individual to select the particular events that will automatically activate the individual's particular sleeve 400.

In an alternative embodiment, the sleeve 400 can be positioned within and attached to previously described sleeve 100. As such, the neoprene rubber body 112 of sleeve 100 serves as an outer protective layer for plastic sleeve 400. The outer surface of sleeve 400 is attached to the inner surface of sleeve 400, with the flexible printed circuit board 422 of sleeve 400 aligned with the central rectangular opening 106 of sleeve 100. Sleeve 400 can be attached to sleeve 100 by an adhesive or other suitable attachment means. In this embodiment, the logo can be omitted from the flexible printed circuit board 422, and instead printed or engraved on the insert section 116 of the rubber sleeve 100. The flexible printed circuit board 422 illuminates the logo 118 of the insert section 116.

Figure 15:
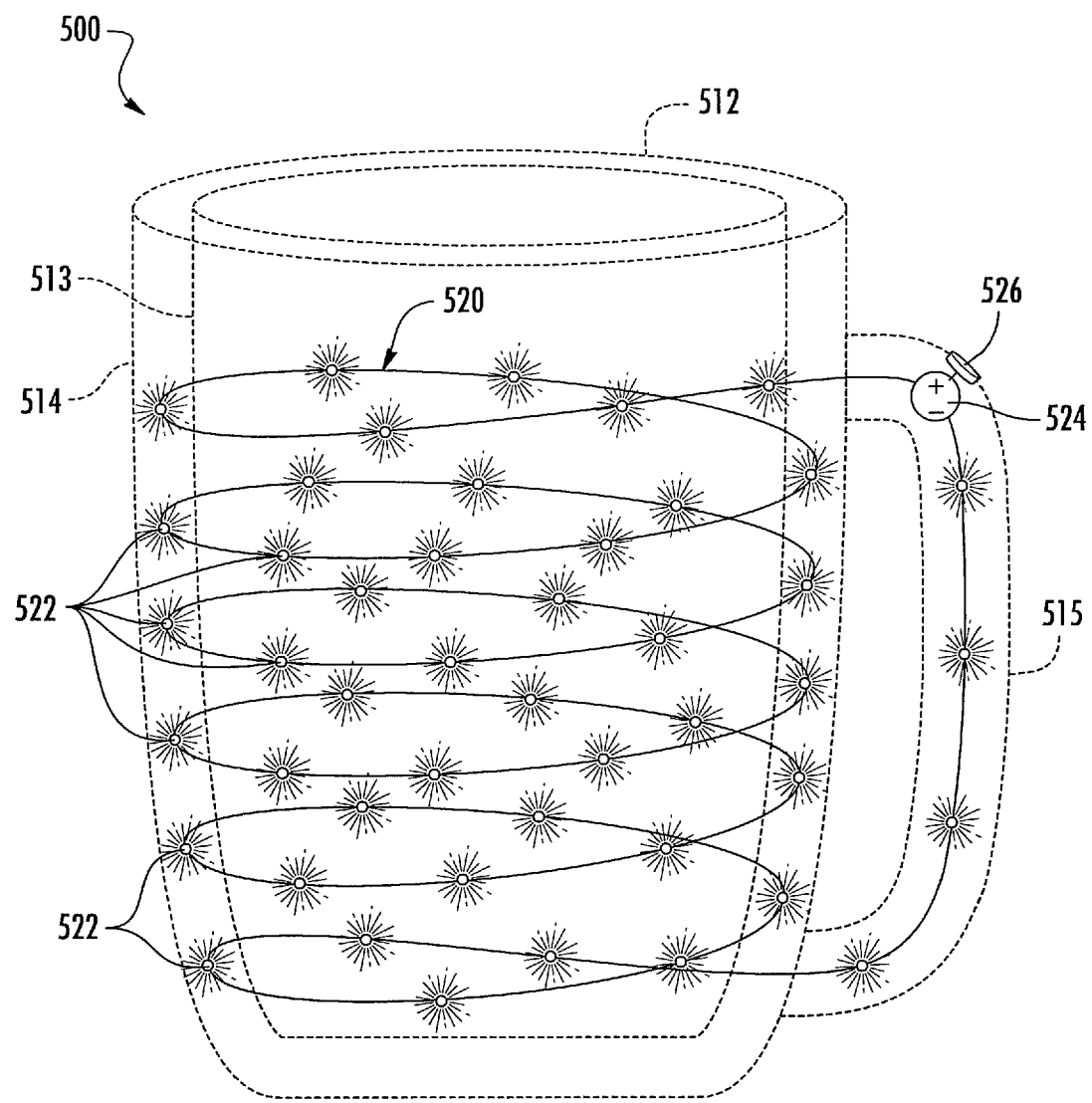
FIG. 15 is a container apparatus according to another embodiment of the invention.

A beverage container according to another preferred embodiment of the invention is illustrated in FIG. 15, and shown generally at reference numeral 500. The container 500 comprises a cup body 512 made of a transparent or translucent material such as polycarbonate plastic, and a light assembly 520 positioned inside of the cup body 512. In an alternative embodiment, only a portion of the cup body 512 is made of a transparent or translucent material, and the remaining portion of the cup body 512 can be made of a non-transparent/non-translucent material such as stainless steel.

The light assembly 520 can be comprised of a plurality of light emitting devices 522, a power source 524 operatively connected to supply power to the light emitting devices 522, and an on/off button 526 operatively connected to the light emitting devices 522 for selectively turning the light emitting devices 522 on and off. Preferably, each light emitting device 522 comprises a light emitting diode (LED). The light emitting diodes 522 are positioned between the interior and exterior sidewalls 513, 514, respectively, of the cup 512 and within the cup handle 515, as shown in FIG. 15. The light emitting diodes 522 extend in a circular manner around the circumference of the interior sidewall 513, as shown in FIG. 15. Alternatively, the light assembly 520 can comprise an illuminated fiber optic cable positioned within the interior and exterior sidewalls 513, 514 and handle of the cup 512.

Preferably, the power source comprises a battery 524. Alternatively, the power source can be a solar cell that powers the light emitting diodes 522. In another alternative embodiment, the power source can comprise a solar cell that recharges a battery that powers the light emitting diodes 522.

The light emitting diodes 522 are operatively connected to the battery 524 and the on/off switch 526. The battery 524 and the on/off switch can be positioned on the cup handle 515, as shown in FIG. 15. The light assembly 520 is turned on by pressing the on/off button 526, and the light emitting diodes 522 illuminate the cup 512.

In an alternative embodiment, the light assembly 520 can include a thermal sensor operatively connected to the power source 524 so that the light emitting diodes 522 are activated when the sensor detects a predetermined high or low temperature in the beverage container. In yet another alternative embodiment, the power source 524 can be recharged from temperature variations of the cup 512, utilizing a stirling engine.

Figure 16:
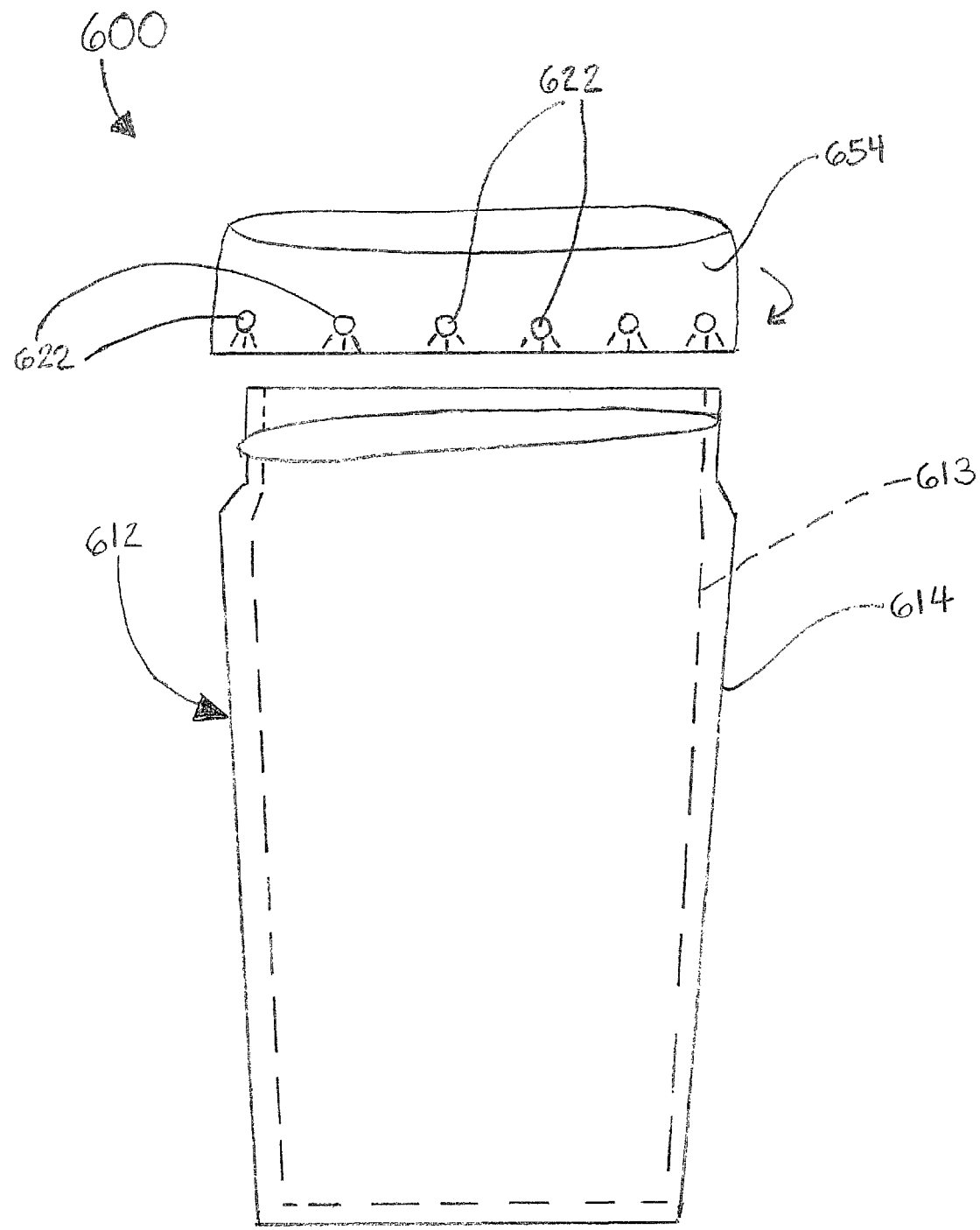
FIG. 16 is a container apparatus according to another embodiment of the invention.
Figure 17:
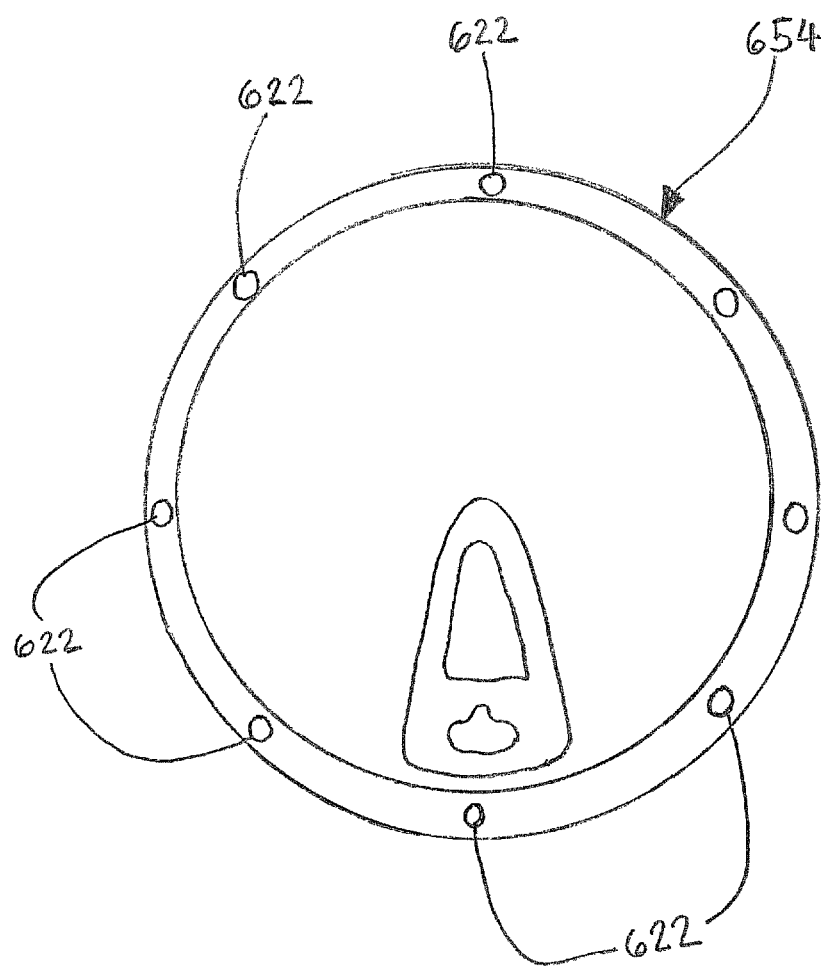
FIG. 17 is a top plan view of the container apparatus of FIG. 16.

A beverage container according to another preferred embodiment of the invention is illustrated in FIGS. 16 and 17, and shown generally at reference numeral 600. The beverage container comprises a body 612 and a top lid 654 that can be releasably attached to the top opening of the body. The top lid 654 and the top of the container body 612 can have complementary threading, such that the top lid 654 can be screwed onto the top of the container body 612. The top lid 654 contains a light assembly comprising a plurality of light emitting devices 622 positioned proximate the outer edge of the top lid 654, as shown in FIG. 17. The container body 612 comprises an inner wall 613 and an outer wall 614, as shown in FIG. 16.

The light emitting devices 622 can be light emitting diodes. The light assembly includes a power source and an on/off mechanism operatively connected to the light emitting devices 622. The on/off mechanism can be a tilt switch that turns on the light emitting devices 622 by a mechanism making power contact when the container 600 is tilted or shaken.

The top lid 654 can be made of a material that is not transparent or translucent. The top lid 654 includes a plurality of port holes formed in the underside of the lid 654, and each light emitting device 622 is positioned directly above one of the port holes so that each light emitting device 622 can project light downwardly into the container body 612.

The inner and outer walls 613, 614 can be made of a transparent or translucent material, such as polycarbonate plastic. The light emitting devices 622 are positioned in a circular formation along the outer edge of the top lid 654 such that the light emitting devices 622 project light into the space between the inner and outer walls 613, 614. Alternatively, the inner wall 613 is made of a material that is not transparent or translucent, such as stainless steel, and the outer wall 614 is transparent or translucent. In another alternative embodiment, only a portion of the outer wall 614 is transparent/translucent and the remaining portion of the outer wall 614 is not transparent or translucent. The transparent/translucent portion of the outer wall 614 serves as window that allows the light from the light emitting devices 622 to pass through. A logo can be printed on the transparent/translucent portion of the outer wall 614, and the logo is illuminated by the light emitting devices 622.

Another embodiment of the invention comprises a beverage container, and a light assembly contained in a housing that can be releasably attached to the base of the tumbler. The light assembly comprises a light emitting device, power source and on/off mechanism. The beverage container can be a tumbler comprising a base and a sidewall extending upwardly from the base. Preferably, the base and the sidewall are made of a transparent or translucent material, and the housing containing the light assembly is made of a transparent or translucent material. Alternatively, only a portion of the sidewall is made of a transparent or translucent material. A logo can be formed on the transparent/translucent portion of the sidewall, which acts as a window that allows the light emitting device to illuminate the logo. The light assembly housing can have male threading on its outer surface and the outer surface of the tumbler base can have complementary female threading that can mate with the light assembly housing threading. The light assembly housing can be screwed onto the tumbler base, and the light device beams light through the housing. The on/off mechanism can be a button or switch, or the light emitting device can be activated when the housing is rotated on the tumbler base. In an alternative embodiment, the light assembly can be housed in a transparent/translucent top lid, such as the lid 154 shown in FIG. 4, and releasably attached at the top opening of the tumbler. In this embodiment, the light assembly housing is a transparent/translucent lid that is screwed on at the top of the tumbler. The light emitting device contained in the lid beams light downwardly into the tumbler.

A container sleeve apparatus and method of using same are described above. Various changes can be made to the invention without departing from its scope. The above description of embodiments of the invention are provided for the purpose of illustration only and not limitation—the invention being defined by the claims and equivalents thereof.

What is claimed is:

1. A container apparatus comprising:
   (a) a container adapted for containing a beverage, the container comprising a base and a sidewall extending upwardly from the base;
   (b) a light assembly positioned on the container, the light assembly comprising a light emitting device attached to an outer surface of the sidewall of the container, a power source operatively connected to the light emitting device to supply power to the light emitting device;
   (c) an elastic sleeve adapted for positioning on the outer surface of the sidewall of the container having a central opening formed therein, the elastic sleeve having an inner surface and an opposed outer surface, the inner surface adapted for being positioned directly against the outer surface of the sidewall of the container;
   (d) an insert section releasably attached to the elastic sleeve and covering the central opening of the elastic sleeve, wherein the insert section is comprised of a transparent or translucent material and is aligned with the light emitting device whereby the light emitting device emits light through the insert section; and
   (e) wherein the insert section comprises a center section and first and second opposed flanges extending outwardly from the center section, and further wherein the elastic sleeve includes a first recessed section formed in the inner surface of the sleeve proximate the central opening of the elastic sleeve and a second recessed section formed in the inner surface of the sleeve proximate the central opening of the elastic sleeve, the first recessed section adapted to receive the first flange of the insert section and the second recessed section adapted to receive the second flange of the insert section, whereby the insert section is maintained within the sleeve.

2. The apparatus according to claim 1, wherein the light emitting device comprises at least one selected from the group consisting of a flexible printed circuit board, a light emitting diode, and an illuminated fiber optic cable.

3. The apparatus according to claim 1, wherein the power source comprises at least one selected from the group consisting of a battery and a solar cell.

4. The apparatus according to claim 1, further comprising an on/off mechanism comprising at least one selected from the group consisting of a button and a switch.

5. The apparatus according to claim 1, wherein the inner surface of the elastic sleeve is concave and the outer surface of the elastic sleeve is convex.

6. The apparatus according to claim 1, wherein the light emitting device comprises a flexible printed circuit board.

7. The apparatus according to claim 1, wherein a logo is printed on the flexible printed circuit board.

8. The apparatus according to claim 1, wherein a logo is printed or engraved on the insert section.

9. The container apparatus according to claim 1, wherein the central opening of the elastic sleeve and the central section of the insert section are rectangular, the central opening defined by opposed upper and lower sides and opposed left and right sides, the central section of the insert section having corresponding opposed upper and lower sides and opposed left and right sides.

10. The container apparatus according to claim 9, wherein the first flange of the insert section extends outwardly from the left side of the central section of the insert section, the second flange of the insert section extends outwardly from the right side of the central section of the insert section, the first recessed section is formed at the left side of the central opening of the elastic sleeve, and the second recessed section is formed at the right side of the central opening of the elastic sleeve.

11. The container apparatus according to claim 1, wherein the central opening of the elastic sleeve has an area equal to an area of the central section of the insert section.

12. A container apparatus comprising:
(a) a container adapted for containing a beverage, the container comprising a base and a sidewall extending upwardly from the base;
(b) a light assembly positioned on the container, the light assembly comprising a light emitting device attached to an outer surface of the sidewall of the container, a power source operatively connected to the light emitting device to supply power to the light emitting device, and an on/off mechanism operatively connected to the light emitting device, wherein engaging the on/off mechanism causes the light emitting device to emit light;
(c) an elastic sleeve positioned on the outer surface of the sidewall of the container having a central opening formed therein, the elastic sleeve having an inner surface and an opposed outer surface, wherein the inner surface of the elastic sleeve contacts the outer surface of the sidewall of the container;
(d) an insert section releasably attached to the elastic sleeve and covering the central opening of the elastic sleeve, wherein the insert section is comprised of a transparent or translucent material and is aligned with the light emitting device whereby the light emitting device emits light through the insert section; and
(e) wherein the insert section comprises a center section and first and second opposed flanges extending outwardly from the center section, and further wherein the elastic sleeve includes first and second recessed sections formed in the inner surface of the elastic sleeve proximate the central opening of the elastic sleeve and adapted to receive the first and second flanges of the insert section whereby the insert section is maintained within the sleeve.

13. The container apparatus according to claim 12, wherein the container comprises a cylindrical or conical tumbler, the elastic sleeve is cylindrical, and the insert section is arcuate.

14. The container apparatus according to claim 12, wherein the container includes an indented section on the outer surface of the sidewall, and the elastic sleeve is positioned within the indented section whereby the elastic sleeve sits flush with the outer surface of the sidewall.

15. The container apparatus according to claim 12, wherein the light emitting device comprises a flexible printed circuit board attached to the outer surface of the sidewall of the container, the power source comprises at least one battery mounted on the outer surface of the sidewall, and the on/off mechanism comprises a button mounted on the outer surface of the sidewall.

16. The container apparatus according to claim 12, wherein a logo is printed or engraved on the insert section whereby the light emitting device illuminates the logo.

17. The container apparatus according to claim 12, wherein the sidewall of the container includes an arcuate section and a flat section, the light emitting device comprises a flexible printed circuit board attached to the flat section of the sidewall, and the insert section is flat.

18. The container apparatus according to claim 12, wherein the elastic sleeve comprises first and second ends and inner and outer surfaces, and at least one knob extending upwardly form the outer surface proximate the first end, and at least one opening formed proximate the second end, the at least one opening adapted for receiving the at least one knob, whereby the first and second ends can be releasably attached to each other.

19. The container apparatus according to claim 12, wherein the central opening of the elastic sleeve and the central section of the insert section are rectangular, the central opening defined by opposed upper and lower sides and opposed left and right sides, the central section of the insert section having corresponding opposed upper and lower sides and opposed left and right sides.

20. The container apparatus according to claim 19, wherein the first flange of the insert section extends outwardly from the left side of the central section of the insert section, the second flange of the insert section extends outwardly from the right side of the central section of the insert section, the first recessed section is formed at the left side of the central opening of the elastic sleeve, and the second recessed section is formed at the right side of the central opening of the elastic sleeve.

* * * * *